US010436928B2

(12) United States Patent
Haber et al.

(10) Patent No.: US 10,436,928 B2
(45) Date of Patent: Oct. 8, 2019

(54) DETECTION AND IMAGING OF SUBSURFACE HIGH IMPEDANCE CONTRAST OBJECTS

(71) Applicants: International Business Machines Corporation, Armonk, NY (US); The University of British Columbia, Vancouver (CA)

(72) Inventors: Eldad Haber, Vancouver (CA); Lior Horesh, North Salem, NY (US)

(73) Assignees: International Business Machines Corporation, Armonk, NY (US); THE UNIVERSITY OF BRITISH COLUMBIA, Vancouver, BC (CA)

( * ) Notice: Subject to any disclaimer, the term of this patent is extended or adjusted under 35 U.S.C. 154(b) by 690 days.

(21) Appl. No.: 14/971,218

(22) Filed: Dec. 16, 2015

(65) Prior Publication Data
US 2016/0178781 A1 Jun. 23, 2016

Related U.S. Application Data

(60) Provisional application No. 62/243,588, filed on Oct. 19, 2015, provisional application No. 62/094,573, filed on Dec. 19, 2014.

(51) Int. Cl.
G01V 3/16 (2006.01)
G01V 3/08 (2006.01)
G01V 3/165 (2006.01)

(52) U.S. Cl.
CPC ............... *G01V 3/16* (2013.01); *G01V 3/081* (2013.01); *G01V 3/082* (2013.01); *G01V 3/165* (2013.01)

(58) Field of Classification Search
None
See application file for complete search history.

(56) References Cited

U.S. PATENT DOCUMENTS 3,906,504 A 9/1975 Guster
3,967,190 A 6/1976 Zonge
(Continued)

FOREIGN PATENT DOCUMENTS

CN 101128747 A 2/2008
CN 101479627 A 7/2009
(Continued)

OTHER PUBLICATIONS

Authorized Officer Shane Thomas, ISR/US PCT International Search Report and Written Opinion, PCT International Patent Application No. PCT/US15/66528, dated Mar. 3, 2016. pp. 1-12.
(Continued)

Primary Examiner — Michael Lebentritt
(74) Attorney, Agent, or Firm — Daniel P. Morris; Otterstedt, Wallace & Kammer, LLP

(57) ABSTRACT

A system for detecting an object in a subsurface environment includes a first recorder of a vertical electromagnetic component, including first pair of polarization orientation components, of an electromagnetic field in a region of interest, a second recorder of an orthogonal electromagnetic component, including second pair of polarization orientation components, of the electromagnetic field in the region of interest, at least one processor configured to derive a pair of transfer functions that relates the vertical electromagnetic component and the orthogonal electromagnetic component of the electromagnetic field for each of the polarization orientation components, at least one processor configured to determine a simulation of the pair of transfer functions for a given impedance distribution, and at least one processor configured to infer a subsurface impedance map using the pair of transfer functions of the recorded data and the simulation of the pair of transfer functions.

20 Claims, 11 Drawing Sheets

(56) References Cited

U.S. PATENT DOCUMENTS

| | | |
|---|---|---|
| 4,359,456 A | 11/1982 | Gosling et al. |
| 4,811,220 A | 3/1989 | McEuen |
| 6,095,260 A | 8/2000 | Mercer |
| 6,133,869 A | 10/2000 | McGill |
| 6,549,012 B2 | 4/2003 | Stolarczyk |
| 6,765,383 B1 | 7/2004 | Barringer |
| 8,421,464 B2 | 4/2013 | Bausov |
| 8,476,906 B2 | 7/2013 | Nielsen |
| 8,510,048 B2 | 8/2013 | Dolgin |
| 8,564,295 B2 | 10/2013 | Olsson |
| 8,633,700 B1* | 1/2014 | England .................. G01V 3/12 324/348 |
| 2003/0215399 A1 | 11/2003 | Smith et al. |
| 2004/0233103 A1* | 11/2004 | Toshev .................... H01Q 3/34 342/383 |
| 2005/0163737 A1 | 7/2005 | Lemoine et al. |
| 2005/0264294 A1 | 12/2005 | Constable |
| 2009/0171587 A1* | 7/2009 | Lu ........................ G01V 3/083 702/7 |
| 2009/0284258 A1 | 11/2009 | Morrison |
| 2010/0001714 A1* | 1/2010 | Royle ..................... G01V 3/08 324/67 |
| 2010/0332163 A1* | 12/2010 | Surdon ................ G01R 31/085 702/59 |
| 2010/0332198 A1* | 12/2010 | Wahrmund ............. G01V 3/12 703/2 |
| 2011/0038823 A1 | 2/2011 | Phipps et al. |
| 2012/0123683 A1* | 5/2012 | Loseth .................... G01V 3/12 702/6 |
| 2012/0253680 A1* | 10/2012 | Thompson .......... G01V 11/007 702/13 |
| 2014/0240162 A1 | 8/2014 | Debroux |
| 2014/0254317 A1* | 9/2014 | Thompson ............. G01V 11/00 367/21 |
| 2015/0103624 A1* | 4/2015 | Thompson ............... G01V 1/20 367/7 |

FOREIGN PATENT DOCUMENTS

| | | |
|---|---|---|
| CN | 104215938 A | 12/2014 |
| GB | 2113116 A | 8/1983 |

OTHER PUBLICATIONS

PRC (China) Pat. Appln. No. 201580068939A, State Intellectual Property Office (SIPO) of the People's Republic of China, first office action dated Aug. 8, 2018, pp. 1-5 in Chinese.

PRC (China) Pat. Appln. No. 201580068939A, State Intellectual Property Office (SIPO) of the People's Republic of China, first office action dated Aug. 8, 2017, pp. 1-5 in Chinese.

\* cited by examiner

VERTICAL COMPONENT OF THE MAGNETIC FIELD POLARIZATION 1

VERTICAL COMPONENT OF THE MAGNETIC FIELD DIFFERENCE POLARIZATION 1

VERTICAL COMPONENT OF THE MAGNETIC FIELD POLARIZATION 2

VERTICAL COMPONENT OF THE MAGNETIC FIELD DIFFERENCE POLARIZATION 2

DETECTION AND IMAGING OF SUBSURFACE HIGH IMPEDANCE CONTRAST OBJECTS

CROSS-REFERENCE TO RELATED APPLICATIONS

This application claims the benefit of U.S. Provisional Patent Application No. 62/094,573 filed on Dec. 19, 2014 and U.S. Provisional Patent Application No. 62/243,588 filed on Oct. 19, 2015, the complete disclosures of which are expressly incorporated herein by reference in their entirety for all purposes.

BACKGROUND

The present disclosure relates to the detection of subsurface objects and/or structures, and more particularly to detecting and imaging of deep structures of high electrical impedance contrast compared to their subsurface environments.

Current methods for identification of high impedance contrast objects, and in particular, voids, and tunnels are based on Ground Penetrating Radar (GPR), which utilizes active electromagnetic sources. Controlled, active sources are local and decay rapidly. Therefore, GPR has limited penetration depth. Other methods include statistical sample drills, which can be expensive and limited in terms of spatial resolution, and seismic optic fibers, that cannot detect pre-existing subsurface structure and are highly sensitive to background noise.

BRIEF SUMMARY

According to an exemplary embodiment of the present invention, a system for detecting an object in a subsurface environment includes a first recorder of a vertical electromagnetic component of an electromagnetic field in a region of interest, wherein the vertical electromagnetic component includes first pair polarization orientation components, a second recorder of an orthogonal electromagnetic component of the electromagnetic field in the region of interest, wherein the orthogonal electromagnetic component includes second polarization orientation components, at least one processor configured to derive at least two transfer functions that relate the vertical electromagnetic component and the orthogonal electromagnetic component of the electromagnetic field for each of the polarization orientation components, at least one processor configured to determine a simulation of the at least two transfer functions for a given impedance distribution, and at least one processor configured to infer a subsurface impedance map using the at least two transfer functions of the recorded data and the simulation of the at least two transfer functions.

According to an exemplary embodiment of the present invention, a method for detecting an object in a subsurface environment includes collecting data indicative of an orthogonal component of an electromagnetic field, collecting data indicative of a vertical component of an electromagnetic field, deriving a pair of actual transfer functions using the data indicative of the orthogonal component and the data indicative of the vertical component of the electromagnetic field, deriving a pair of simulated transfer functions using a simulation of a background primary field, performing an inversion to update model parameters reducing a discrepancy between the pair of actual transfer functions and the pair of simulated transfer functions using a-priori information, and simulating a secondary field for a set of model parameters using the inversion and the pair of simulated transfer functions to resolve a subsurface impedance map including the object.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

BRIEF DESCRIPTION OF THE SEVERAL VIEWS OF THE DRAWINGS

Preferred embodiments of the present invention will be described below in more detail, with reference to the accompanying drawings.

DETAILED DESCRIPTION

According to an exemplary embodiment of the present invention, high electrical impedance contrast objects are detected and/or imaged in a subsurface environment. According to an exemplary embodiment of the present invention, a system records a response of the subsurface to non-controlled, electromagnetic (EM) sources. The non-controlled, EM sources typically originate distantly and therefore, propagate in planer-like waves, entailing superior penetration depth. In at least one embodiment of the present invention, the interaction of these EM sources with the ground produces an EM field response, which is passively recorded by a measurement device carried on an airborne platform (vertical component) and polarization-wise. Data acquisition performed by the measuring device can be performed using a coil having diameter of about 1 meter. In addition to airborne acquisition, polarizations of the orthogonal field components are collected from either an additional airborne system or from a ground station.

According to one or more embodiments of the present invention, an airborne platform measures secondary magnetic fields as a function of location and frequency due to some primary magnetic or electric source. Non-controlled sources evolve from remote thunder-storms and other natural electromagnetic (EM) sources in the multi-sphere.

Other exemplary non-controlled (or passive) sources include solar wind, which induces telluric currents. Solar wind is a stream of plasma released from the upper atmosphere of the Sun. Solar wind is responsible for the overall shape of Earth's magnetosphere and fluctuates in its speed, density and direction. A telluric current (tellūs is "earth" in Latin), or Earth current, is an electric current that moves underground or through the sea. Telluric currents are of low frequency and travel over large areas.

EM waves can be described as transverse waves formed of an electric field vector E component and an orthogonal magnetic field H component in directions perpendicular to the direction of wave propagation z. The electric field vector E and magnetic field H are also perpendicular to each other.

Figure 1:
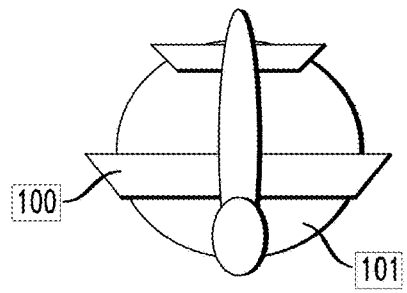
FIG. 1 depicts an airborne platform for data acquisition of orthogonal components of an of the electromagnetic field according to an exemplary embodiment of the present invention.
Figure 2A:
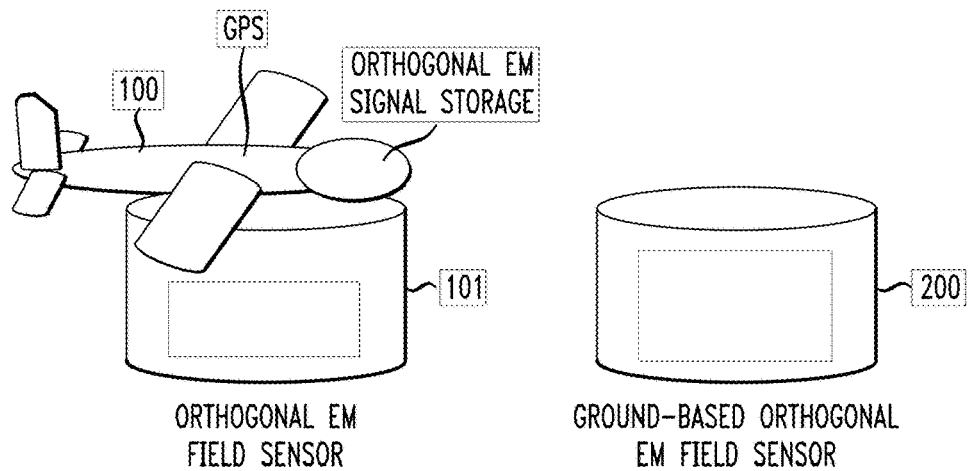
FIGS. 2A-B depict platforms for data acquisition according to an exemplary embodiment of the present invention.
Figure 2B:
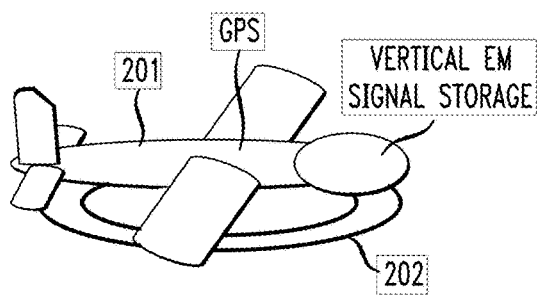
Figure 3:
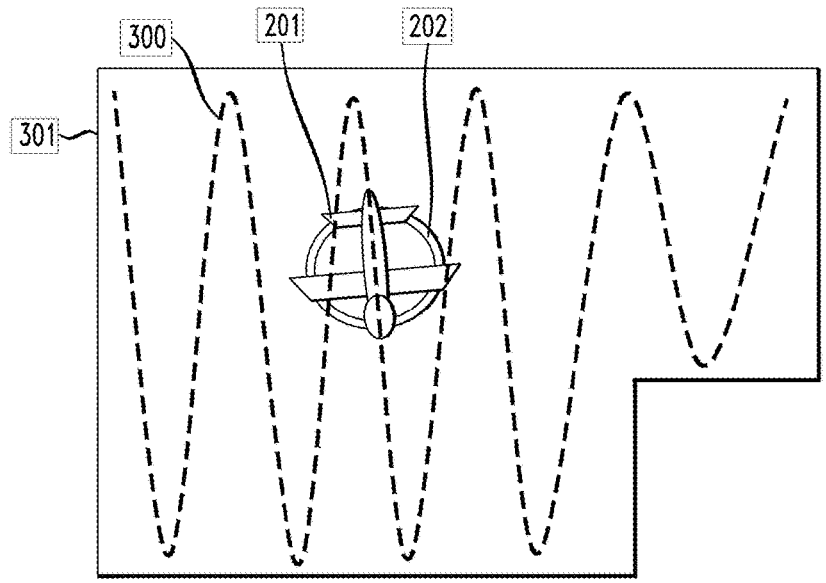
FIG. 3 depicts an airborne platform for data acquisition of a vertical component according to an exemplary embodiment of the present invention.

Referring to FIG. 1, a remote reference acquisition system can be integrated into an airborne platform 100 for obtaining EM data. In FIG. 2A, the airborne platform 100 includes an orthogonal EM field sensors for detection the orthogonal components 101 of the field. In at least one embodiment of the present invention, the collection of the orthogonal components is performed from a remote ground-based sensor location using sensor 200. In FIG. 2B, a vertical component airborne system 201 includes a vertical component sensor (e.g., coil) 202. Each of the airborne systems can include a global position system (GPS) and storage for recording the data. Referring to FIG. 3, the airborne platform 201 flies a course 300 or data collection trajectory within a domain of interest 301, gathering both polarizations of the vertical component of the field.

Electromagnetic fields may oscillate in more than one orientation. Linear and circular (and more generally elliptical) polarization patterns are examples of this property. According to an embodiment of the present invention, to overcome the challenge of not knowing the source electromagnetic field (e.g., arriving from solar wind, remote thunderstorms, remote man made sources), two polarizations (i.e., polarization orientation components) of each field direction (vertical and horizontal) are recorded. This can be referred to as polarization decomposition. Having this information about the polarizations of each field direction enables the vertical field components to be associated with the horizontal components via one or more transfer functions.

Figure 4:
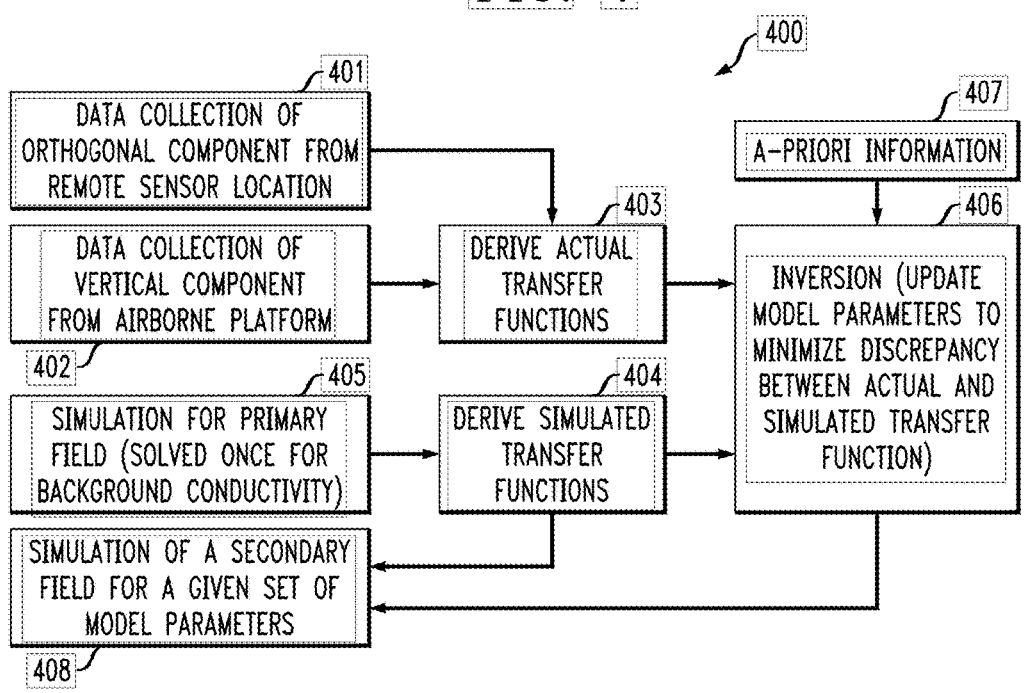
FIG. 4 is a flow diagram of a data processing method according to an exemplary embodiment of the present invention.

A data processing method according to one or more embodiments of the present invention is presented in FIG. 4. In at least one embodiment of the present invention, the method for detection of a subsurface object 400 includes data collection of an orthogonal components 401, data collection of a vertical component 402. The collected data is used to derive actual transfer functions 403. Simulated transfer functions 404 are derived using a simulation of a primary field 405. An inversion process is performed as 406 updating model parameters to reduce the discrepancy between actual and simulated transfer function using the actual transfer functions 403, simulated transfer functions 404 and a-priori information 407. A simulation of a secondary field for a given set of model parameters is determined 408 using the inversion 406 and the simulated transfer functions 404.

In principle, one would expect a passive source acquisition system to underperform compared to an acquisition system using an active source. In particular, passive source acquisition relies on natural sources, such as solar wind, or remote thunderstorms that are neither controllable nor known. According to one or more embodiments of the present invention, a system combining an airborne platform acquiring vertical components and another airborne system or ground station acquiring orthogonal electromagnetic components, allow for a formulation in which the intensity of the unknown, passive sources is eliminated.

Data collection by itself is not sufficient to obtain images. The imaging problem is ill-posed by nature, and therefore requires special inversion techniques for attaining stable and unique solution recovery. The lack of knowledge as for the EM sources typically imposes severe difficulties for impedance recovery, on top of the conventional ones for active source EM inversion problems.

These difficulties can be resolved by the incorporation of transfer equations, which relate polarizations and components of the EM field:

$$H_z(r) = T_{zx}(r, r_0) H_x(r_0) + T_{zy}(r, r_0) H_y(r_0) \tag{1}$$

In which r is a location of a vertical field and $r_0$ is a location of orthogonal reference field. Both locations r and $r_0$ may change over time. Solving the transfer function uses knowledge of both polarizations. The field for each polarization (1,2) is given by:

$$H_z^{(1)}(r) = T_{zx}(r, r_0) H_x^{(1)}(r_0) + T_{zy}(r, r_0) H_y^{(1)}(r_0)$$

$$H_z^{(1)}(r) = T_{zx}(r, r_0) H_x^{(2)}(r_0) + T_{zy}(r, r_0) H_y^{(2)}(r_0) \tag{2}$$

Thus, the pair of transfer functions are given by:

$$T_{zx} = \frac{H_y^{(2)}H_z^{(1)} - H_y^{(1)}H_z^{(2)}}{H_x^{(1)}H_y^{(2)} - H_x^{(2)}H_y^{(1)}} \text{ and } T_{zy} = \frac{H_x^{(1)}H_z^{(2)} - H_x^{(2)}H_z^{(1)}}{H_x^{(1)}H_y^{(2)} - H_x^{(2)}H_y^{(1)}} \quad (3)$$

In these settings, the inverse problem is of large-scale and requires addressing multiple sources. Both considerations mandate the incorporation of appropriate inversion schemes.

According to one or more embodiments of the present invention, the recovery of the impedances from the data involves signal processing, simulation (forward problem), and inverse problem components. In the signal-processing component, the acquired signal is pre-processed to ensure integrity of the acquired data. In the simulation component, the EM field interaction with matter is modeled to enable prediction of the expected data for a given configuration of model parameters (impedance distribution in the domain) and boundary conditions. The physics of the forward problem are governed by Maxwell's equations in the quasi-static regime.

Maxwell equations in the quasi static regime can be written as:

$$\nabla \times E = -iw\mu H$$

$$\nabla \times H = \sigma E$$

$$\hat{n} \times H = 0 \quad (4)$$

where $\nabla \times$ is the curl differential operator, E is the electric field, H is the magnetic field, w is a frequency, $\sigma$ is the conductivity, $\mu$ is the magnetic permeability and $\hat{n}$ is a normal field direction.

The modeling problem can be solved over a discrete grid where an accurate solution involves incorporation of models of high dimensionality. Efficient and accurate modeling can be performed using numerical solvers confirmed to handle effectively adaptive grids and high-order discretization schemes. An example for the forward solution is presented below. A potentials formulation (e.g., vector potential A, scalar potential $\phi$) is expressed as:

$$E = -iwA - \nabla\phi$$

$$H = \nabla \times A \quad (5)$$

According to one or more embodiments of the present invention, the Coulomb gauge expressed as:

$$\nabla \cdot A = 0 \quad (6)$$

where $\nabla \cdot$ is the divergence differential operator, is used as a gauge fixing condition.

According to one or more embodiments of the present invention, a background primary field is solved first and only once as:

$$\begin{pmatrix} \nabla \times \mu^{-1} \nabla \times iw\mu_0 \sigma & iw\mu_0 \sigma \nabla \\ \nabla \cdot \sigma & \nabla \cdot \sigma \nabla \end{pmatrix} \begin{pmatrix} A_b \\ \varphi_b \end{pmatrix} = \begin{pmatrix} s_{A_p} \\ s_{\varphi_p} \end{pmatrix} \quad (7)$$

According to one or more embodiments of the present invention, the secondary field is then obtained by solution of the system:

$$\begin{pmatrix} \nabla \times \mu^{-1} \nabla \times + iw\mu_0 \sigma & iw\mu_0 \sigma \nabla \\ \nabla \cdot \sigma & \nabla \cdot \sigma \nabla \end{pmatrix} \begin{pmatrix} A_s \\ \varphi_s \end{pmatrix} = \begin{pmatrix} iw\mu_0 \delta\sigma(iwA_b + \nabla\varphi_b) \\ \nabla \cdot \delta\sigma(iwA_b + \nabla\varphi_b) \end{pmatrix} \quad (8)$$

The secondary fields are determined as:

$$E_s = -iwA_s - \nabla\phi_s$$

$$H_s = \nabla \times A_s \quad (9)$$

And consequently the determined (simulated) transfer functions are determined as $T_{zx}$ and $T_{zy}$ (see also the description of Eq. 3).

Referring to the inference of the subsurface, according to one or more embodiments of the present invention, a link between the observed data $T^{obs}$ (the transfer functions linking vertical EM field with the orthogonal) and the observation model F is written as:

$$T(\sigma) = F(\sigma; y) + \varepsilon \quad (10)$$

wherein, $\varepsilon$ is measurement noise and y is an experimental design configuration.

In the inverse problem component, a distribution of the impedance can be recovered. As opposed to the forward problem (modeling problem) in which the attributes (e.g., impedance distribution) of the model are assumed to be known and the electric potentials are determined, here the opposite process is considered. That is, given a number of spatially sparse measurements, that are typically noisy and indirect, the inverse problem component (see method 500, FIG. 5) recovers the attribute (impedance distribution). The inverse problem is ill-posed by nature, and therefore requires special techniques for attaining stable and unique solution recovery. An example for inversion of EM data is presented below.

According to one or more embodiments of the present invention, a subsurface impedance map is resolved using an optimization problem of the form:

$$\hat{\sigma} = \underset{\sigma}{\operatorname{argmin}} \; \underbrace{L(F(\sigma; y), T^{obs}(y))}_{\text{data misfit}} + \underbrace{R(\sigma)}_{\text{a-priori information}} \quad \text{s.t. constraints} \quad (11)$$

where L is a noise model and R an a-priori functional (e.g., edge preserving total variation function, parametric level set), which regularizes and stabilizes the solution (e.g., the subsurface image). (See also, 501, FIG. 5.)

According to one or more embodiments of the present invention, in a parametric level-set re-parameterization, the model $\sigma$ can be represented as comprised of few classes (e.g., foreground for tunnels and background for surrounding subsurface ground). According to one or more embodiments of the present invention, the parameterization uses a regularized Heaviside function H, and a characteristic function:

$$\sigma(x) = p_f(x)H(\phi(x, \alpha) - c) + p_b(x)(1 - H(\phi(x, \alpha) - c)) \quad (12)$$

$$\begin{cases} \phi(x, a) > 0 & \forall x \in D \\ \phi(x, a) = 0 & \forall x \in \partial D \\ \phi(x, a) < 0 & \forall x \in \Omega \end{cases}$$

where D corresponds to the foreground domain, $\partial D$ the foreground boundary, and $\Omega$ is the background domain. The sensitivity relations below links the parameterization $\alpha$ with the model parameters (e.g., conductivity or impedance)

$$\frac{\partial \sigma}{\partial \alpha_j} = \frac{\partial \sigma}{\partial \phi} \frac{\partial \phi}{\partial \alpha_j} (p_f - p_b) \delta_{rg} (\phi - c) \frac{\partial \phi}{\partial \alpha_j} \quad (13)$$

$$\frac{\partial \sigma}{\partial p_f} = -1 - \frac{\partial \sigma}{\partial p_b} = H_{rg}(\phi - c)$$

For example, if the parametric form of the foreground (e.g., tunnels) is represented using ellipsoids:

$$\phi = \sum_k \frac{1}{2} (x - v_k)^T A_k (x - v_k) - 1 \quad (14)$$

The parameterization α would comprise of $A_k$ the scale, rotation and skew operators, and $v_k$ the displacements of the $k^{th}$ ellipsoid, with derivatives:

$$\frac{\partial \phi}{\partial v_k} = -A(x - v_k) - A^T (x - v_k) \quad (15)$$

$$\frac{\partial \phi}{\partial A_k} = (x - v_k)(x - v_k)^T$$

Once the parameterization is established solution of problem (Eq. 11) can be attained with respect to the parametric representation, α, rather than with respect to the model parameters, α, themselves. Parametrization allows for a reduction in the descriptive length of the underlying entity (impedance distribution in this case) and thereby, alleviates the ill-posed nature of the problem.

Figure 5:
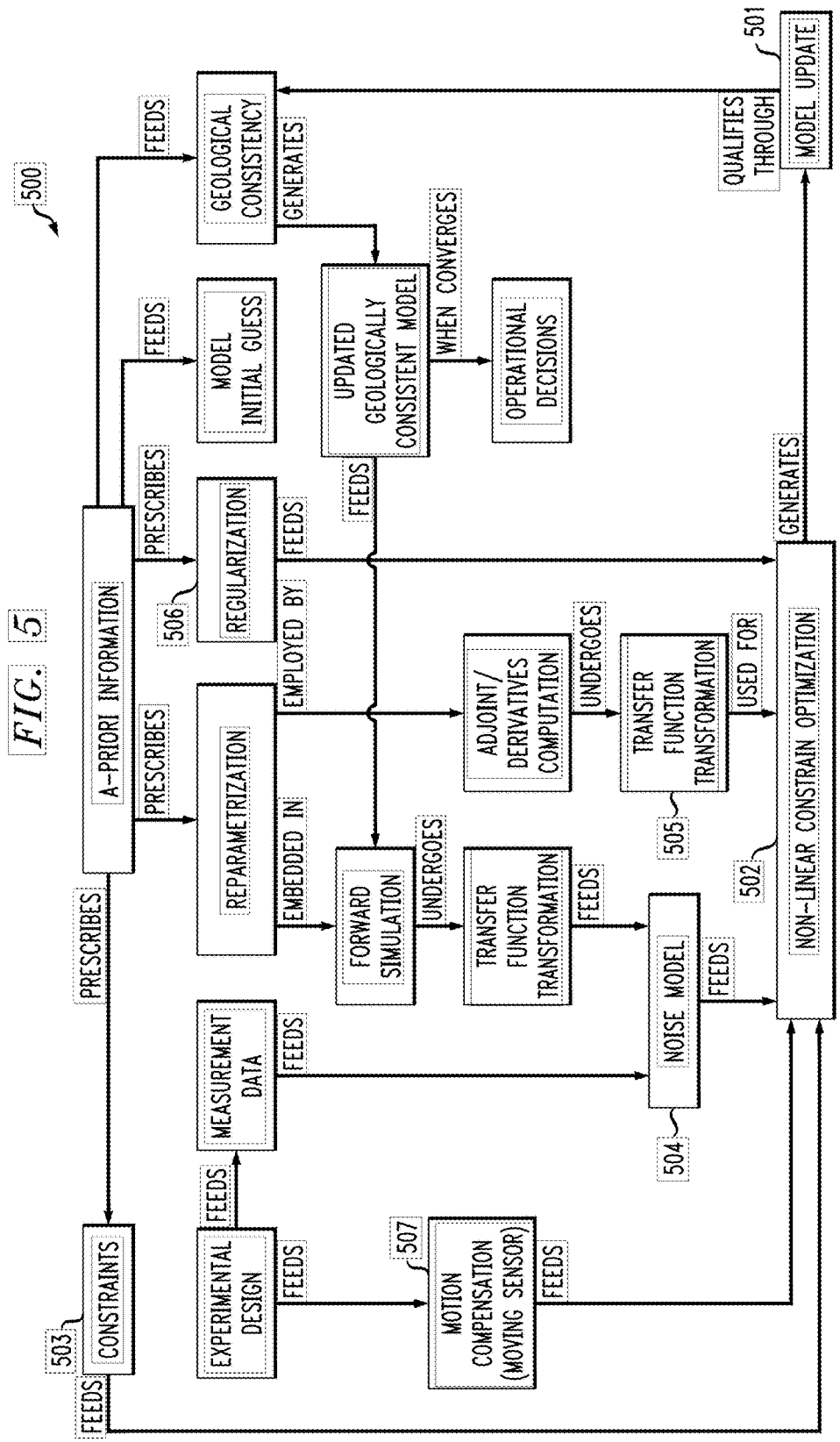
FIG. 5 is a flow diagram for performing an inversion according to an exemplary embodiment of the present invention.

FIG. 5 shows a method 500 for performing the inversion according to an exemplary embodiment of the present invention, wherein model parameters are updated to reduce a discrepancy between actual and simulated transfer functions using the actual transfer functions. As shown in FIG. 5, model updates 501 are generated by a non-linear constraint optimization 502 (see Eq. 11), which takes into consideration a constraint 503 (e.g., that an experimental design configuration represent an improvement on the model), the noise model 504, the transfer function 505 and a regularization 506 (i.e., the a-priori functional). The noise model 504 is derived from a transfer function based on a forward simulation of the model and experimental design configuration and actual measurement data. The non-linear constraint optimization 502 can also use a compensation for motion 507 in the sensors recording the measurement data.

Embodiments of the present invention can be used for detection of tunnels and hardened subsurface spaces, unexploded ordnance, equipment and infrastructure, archaeological remains, in detecting natural resources (aquifers, oil deposits, etc.) and mines (e.g., abandoned mines), in determining the effect of contaminants and pollutant flow in the ground, carbon sequestration, subsurface cover-subsidence and cover-collapse sinkholes, etc.

According to embodiments of the present invention, a system configured for object detection using passive sources can be relatively simple and economic acquisition using small airborne systems, can be implemented regardless of the time of day (e.g., data acquisition can be performed during night time, reducing the exposure of the airborne platform), the airborne platform does not transmit any signals for acquisition, which makes it both stealth and energy efficient, can detect objects at great depth (e.g., up to about 2 kilometers below the surface), and is robust with respect to background impedance.

By way of recapitulation, according to an exemplary embodiment of the present invention, a method for detecting a subsurface object 400 includes data collection of orthogonal components 401, data collection of a vertical component 402. The collected data is used to derive actual transfer functions 403. Simulated transfer functions 404 are derived using a simulation of a primary field 405. An inversion is performed as 406 updating model parameters to reduce discrepancy between actual and simulated transfer functions using the actual transfer functions 403, simulated transfer functions 404 and a-priori information 407. A simulation of a secondary field for a given set of model parameters is determined 408 using the inversion 406 and the simulated transfer functions 404.

Figure 7:
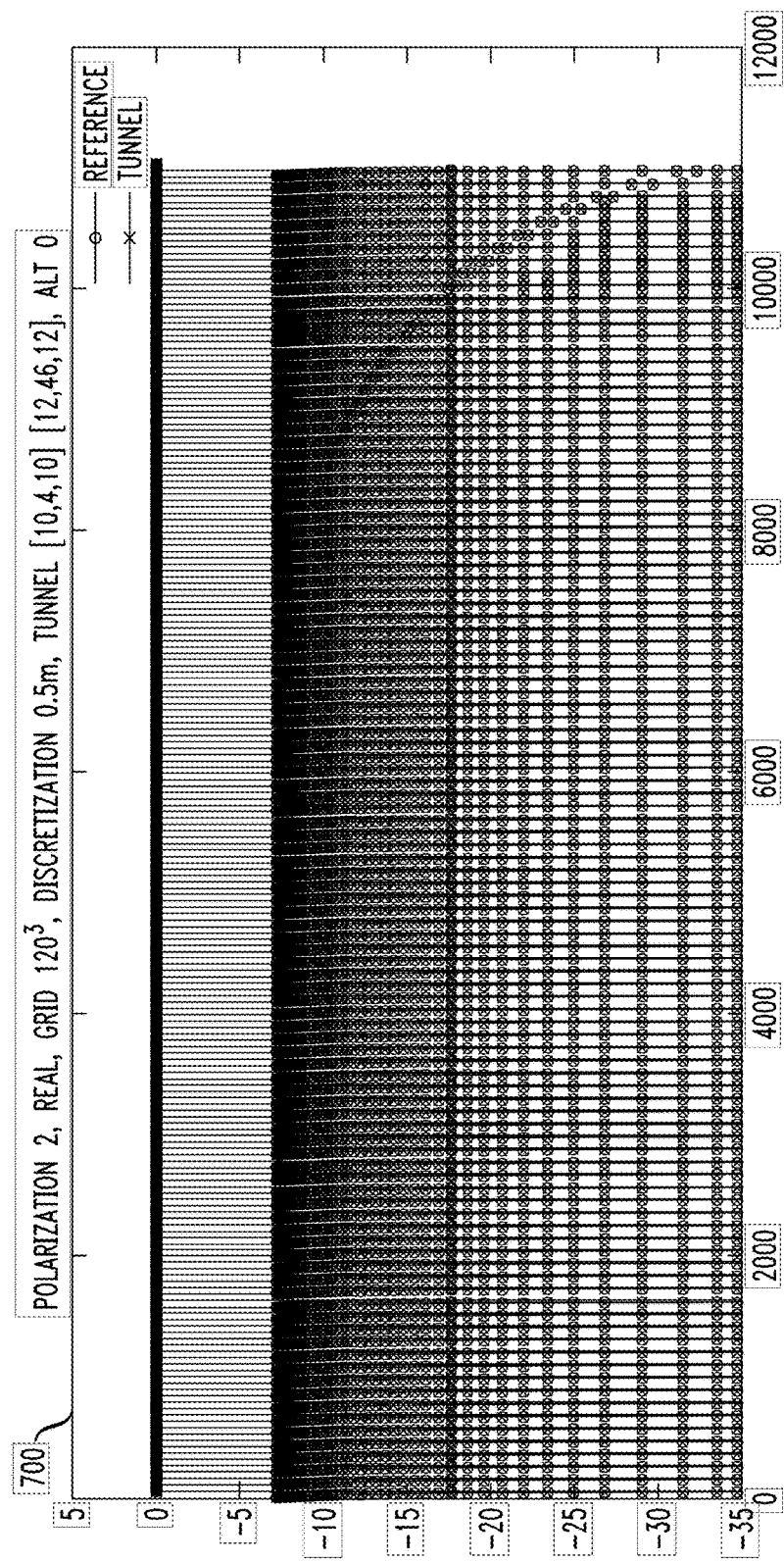
FIG. 7 shows exemplary channel recordings for predicted difference data from simulations of reference (no object) and a model with an object according to an embodiment of the present invention.
Figure 8:
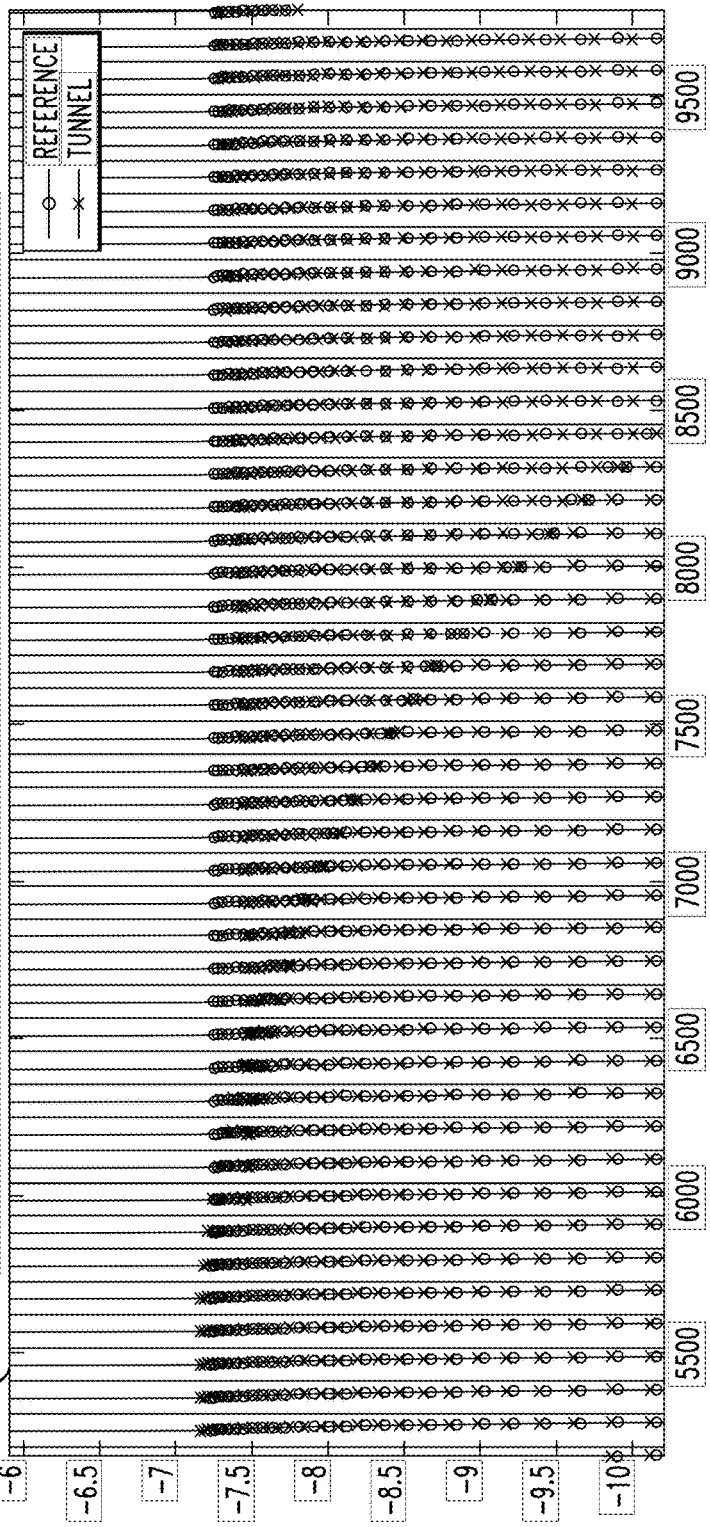
FIG. 8 shows exemplary channel recordings for predicted data from simulations of reference (no object) and a model with an object according to an embodiment of the present invention.
Figure 9:
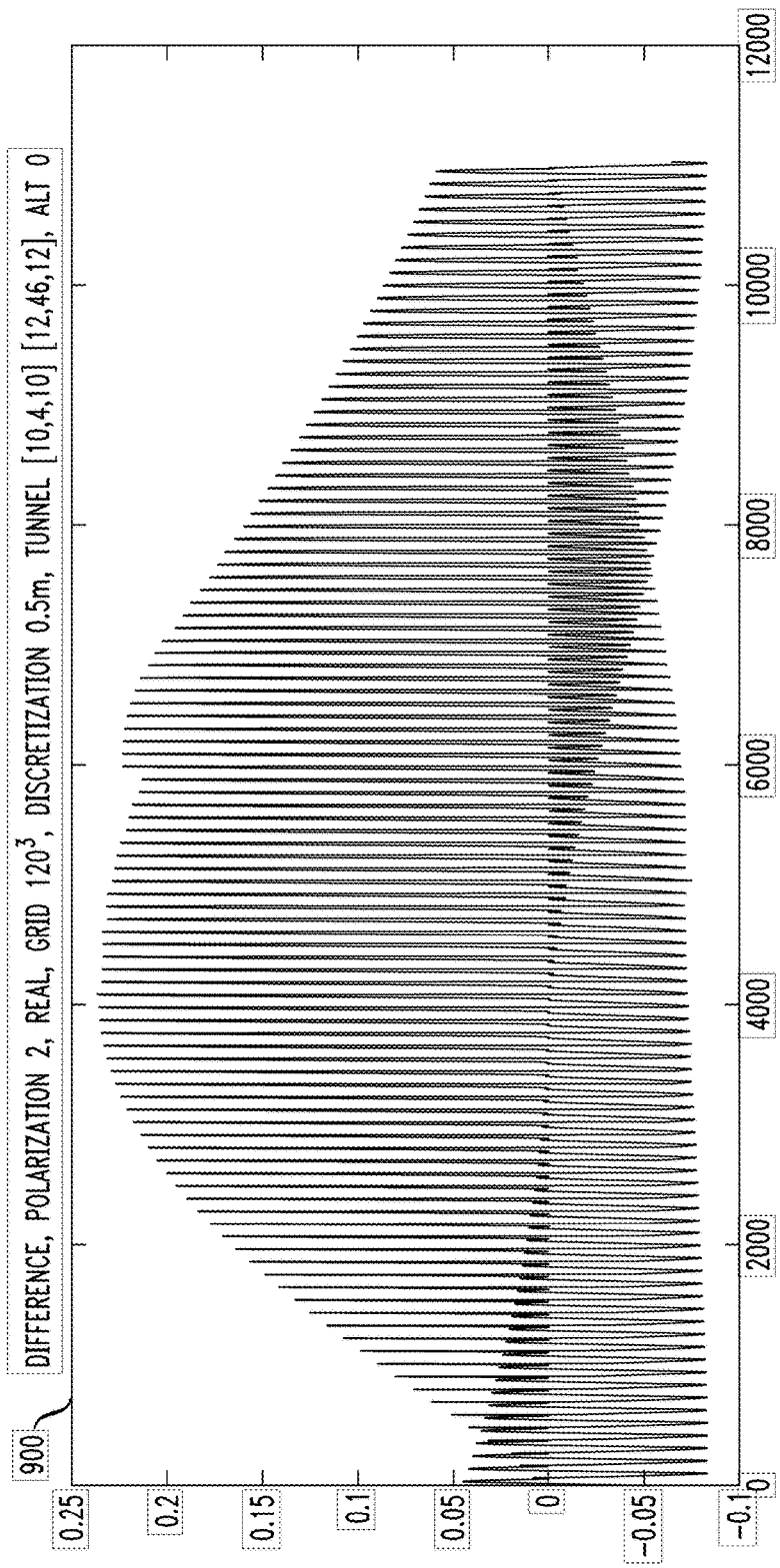
FIG. 9 shows exemplary predicted difference data from simulations of reference (no object) and a model with an object according to an embodiment of the present invention.
Figure 13:
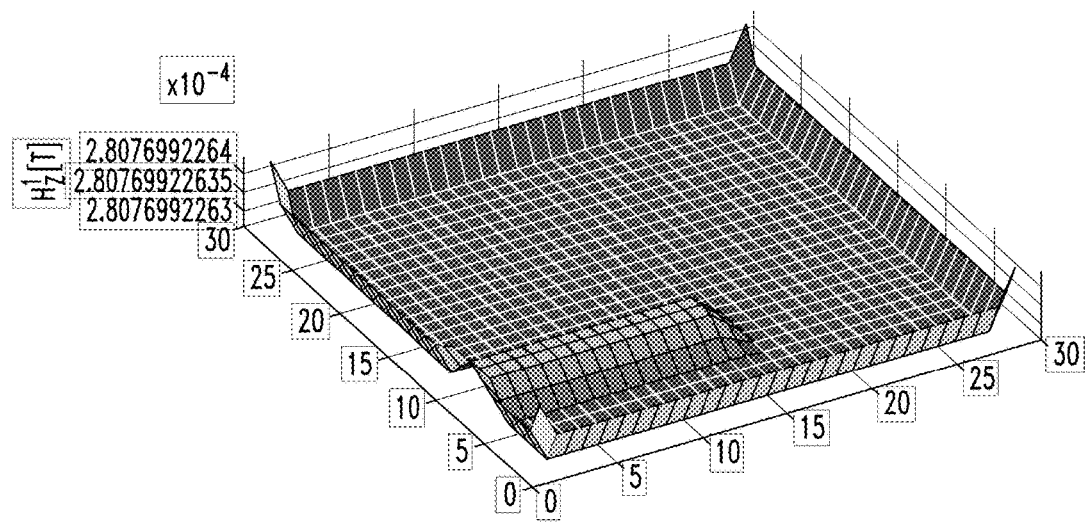
FIGS. 13-14 show a vertical component of a magnetic field and magnetic field difference for a first polarization corresponding to the channel recordings of FIG. 7.
Figure 14:
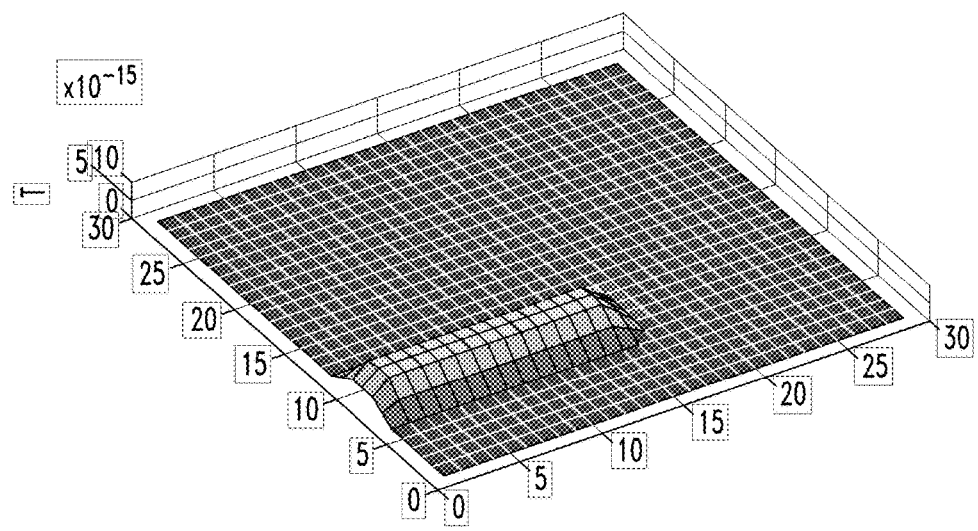

Simulation results are shown in graphs 700, 800 and 900 of FIGS. 7, 8 and 9, respectively. More particularly, FIG. 7 shows exemplary channel recordings 700 for predicted difference data from simulations of reference (no object) and a model with an object according to an embodiment of the present invention. FIGS. 13-14 show a vertical component of a magnetic field and magnetic field difference for a polarization corresponding to the channel recordings of FIG. 7.

Figure 15:
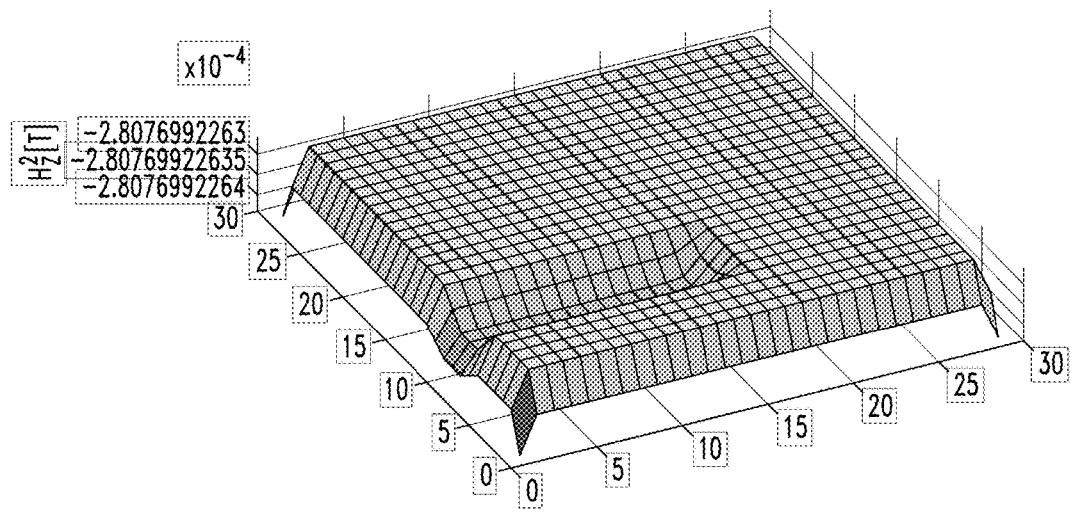
FIGS. 15-16 show a vertical component of a magnetic field and magnetic field difference for a second polarization corresponding to the channel recordings of FIG. 8.
Figure 16:
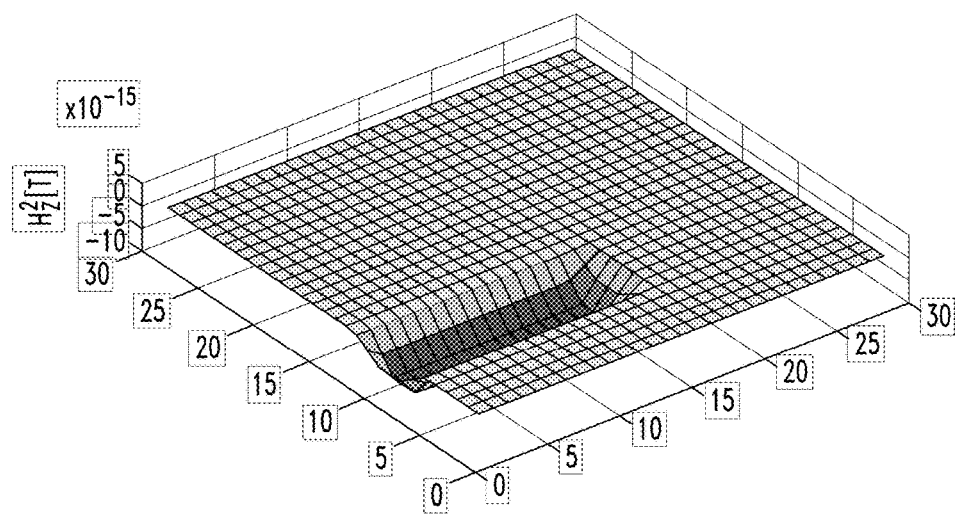

FIG. 8 shows exemplary channel recordings 800 for predicted data from simulations of reference (no object) and a model with an object according to an embodiment of the present invention. FIGS. 15-16 show a vertical component of a magnetic field and magnetic field difference for a second polarization corresponding to the channel recordings of FIG. 8.

FIG. 9 shows exemplary predicted difference data 900 from simulations of reference (no object) and a model with an object according to an embodiment of the present invention.

Figure 10:
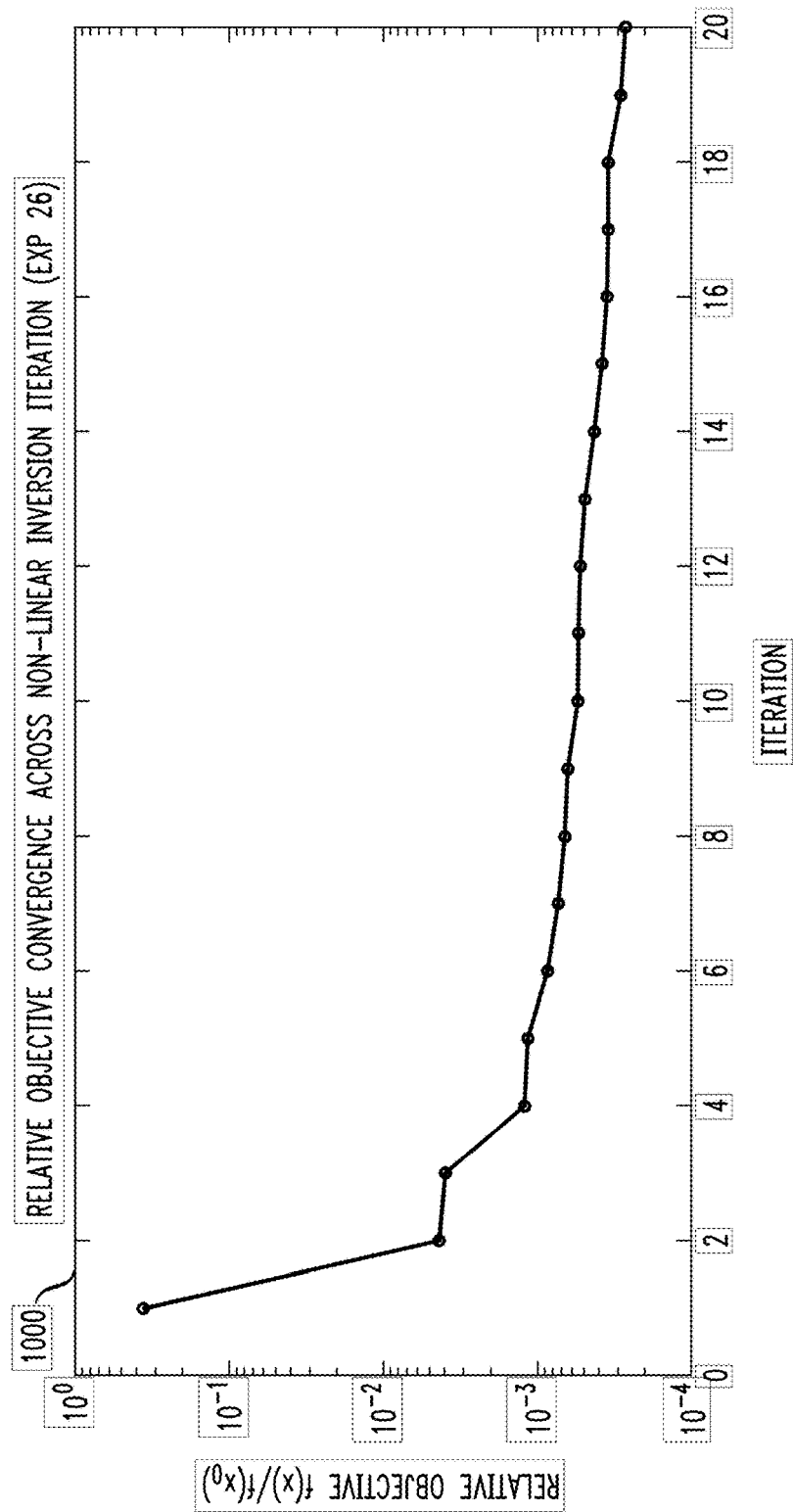
FIG. 10 shows a graph of the convergence of the inversion method according to an exemplary embodiment of the present invention.

Convergence of the inversion process is shown in graph 1000 of FIG. 10.

Figure 11:
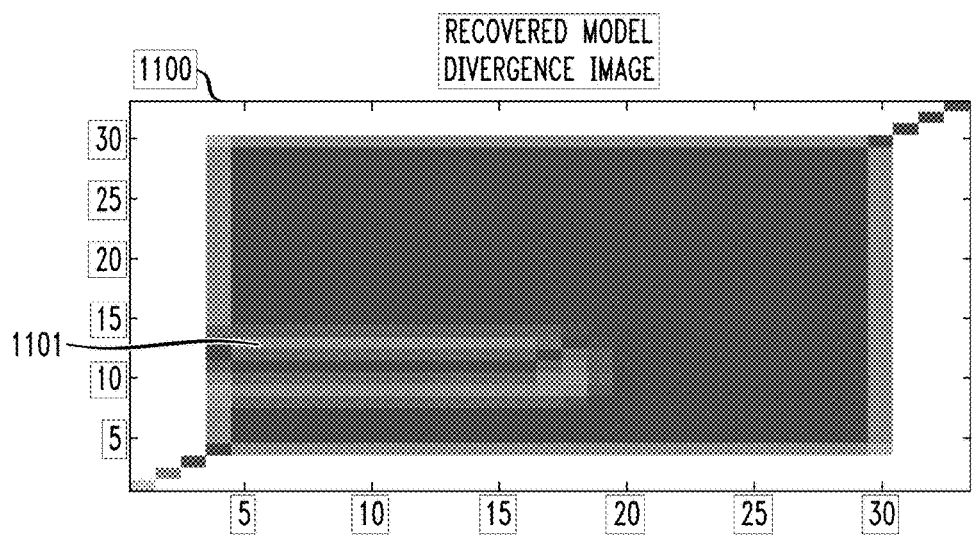
FIG. 11 shows an image of a recovered model (divergence image) according to an exemplary embodiment of the present invention.
Figure 12:
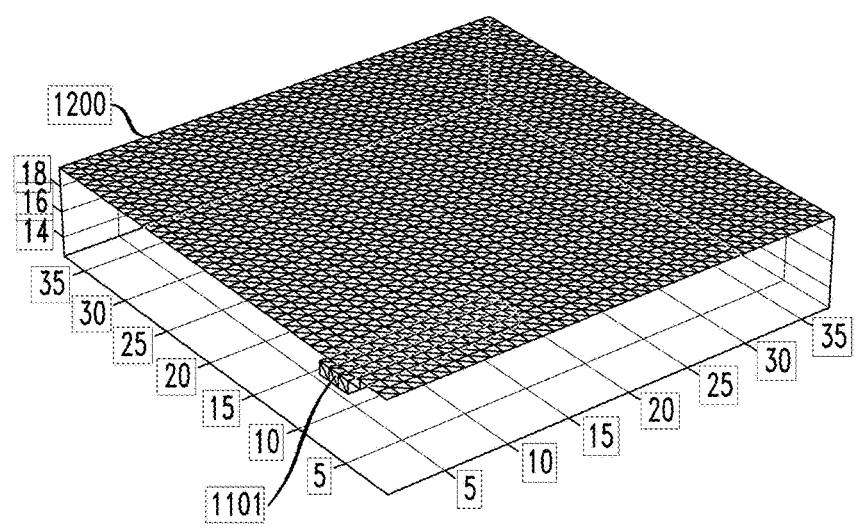
FIG. 12 shows a graph of a true model of an object in a subsurface environment according to an exemplary embodiment of the present invention.

FIG. 11 shows an example of a recovered (inverted) model 1100, including a detected object 1101. The corresponding true impedance model 1200 is shown in FIG. 12, including the object 1101 detected in FIG. 11.

Exemplary embodiments of the present invention can be applied in a number of settings including for example:

| Element | Means |
| --- | --- |
| Prior | Tube-like structures, TV, parametric level set, $L_1$ |
| Multi frequency inversion | Incorporation of data from multiple frequencies |
| Motion compensation | Moving receiver/reference motion compensation |
| Experimental design | Sequential/adaptive experimental design |
| Heterogeneous sources of data | Combine multiple sources of data (seismic, EM, gravity) |
| Multi-scale discretization | Local mesh refinement, OcTree discretization |
| Learning/cognitive capability | Continuous improvements through learning from interpreter's input |

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "vertical component EM sensor," "orthogonal component EM sensor," "positioning system," "processor," "storage," "circuit," "module" or "system."

Figure 6:
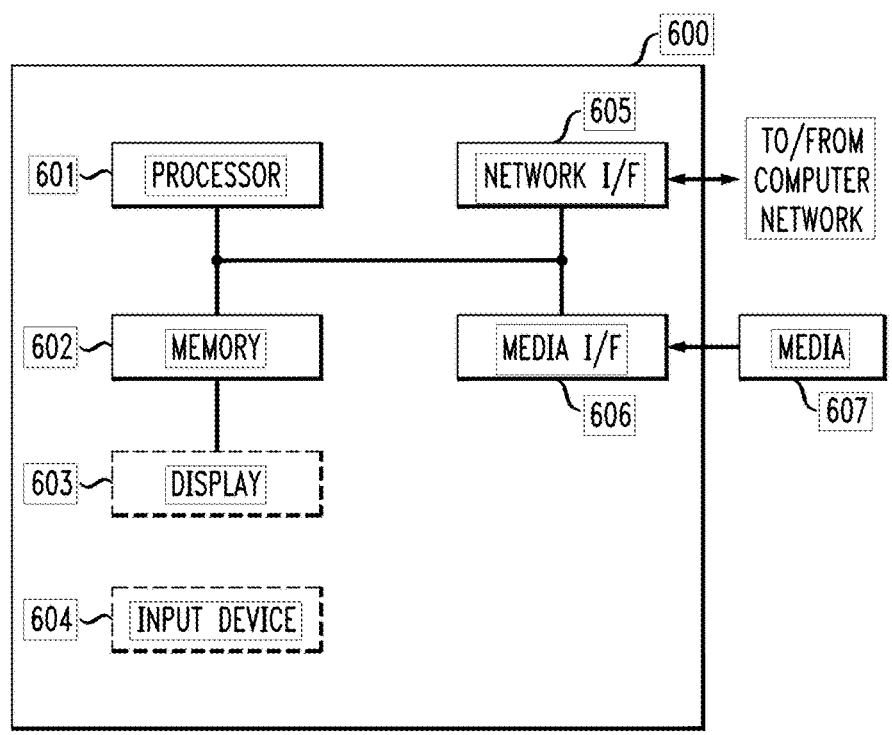
FIG. 6 is a diagram of a computer system configured to detect subsurface structure according to an exemplary embodiment of the present invention.

Referring to FIG. 6; FIG. 6 is a block diagram depicting an exemplary computer system for detecting a subsurface object according to an embodiment of the present invention. The computer system shown in FIG. 6 includes a processor 601, memory 602, display 603, input device 604 (e.g., keyboard), a network interface (I/F) 605, a media IF 606, and media 607, such as a signal source, e.g., camera, Hard Drive (HD), external memory device, etc.

In different applications, some of the components shown in FIG. 6 can be omitted. The whole system shown in FIG. 6 is controlled by computer readable instructions, which are generally stored in the media 607. The software can be downloaded from a network (not shown in the figures), stored in the media 607. Alternatively, software downloaded from a network can be loaded into the memory 602 and executed by the processor 601 so as to complete the function determined by the software.

The processor 601 may be configured to perform one or more methodologies described in the present disclosure, illustrative embodiments of which are shown in the above figures and described herein. Embodiments of the present invention can be implemented as a routine that is stored in memory 602 and executed by the processor 601 to process the signal from the media 607. As such, the computer system is a general-purpose computer system that becomes a specific purpose computer system when executing routines of the present disclosure.

Although the computer system described in FIG. 6 can support methods according to the present disclosure, this system is only one example of a computer system. Those skilled of the art should understand that other computer system designs can be used to implement embodiments of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although illustrative embodiments of the present disclosure have been described herein with reference to the accompanying drawings, it is to be understood that the disclosure is not limited to those precise embodiments, and that various other changes and modifications may be made therein by one skilled in the art without departing from the scope of the appended claims.

The invention claimed is:

1. A system for detecting an object in a subsurface environment comprises:
    a first recorder of a vertical electromagnetic component of an electromagnetic field in a region of interest, wherein the vertical electromagnetic component includes first pair polarization orientation components;
    a second recorder of an orthogonal electromagnetic component of the electromagnetic field in the region of interest, wherein the orthogonal electromagnetic component includes second pair polarization orientation components;
    at least one processor configured to derive a pair of transfer functions that relates the vertical electromagnetic component and the orthogonal electromagnetic component of the electromagnetic field for each of the polarization orientation components;
    at least one processor configured to determine a simulation of the pair of transfer functions for a given impedance distribution; and
    at least one processor configured to infer a subsurface impedance map using the pair of transfer functions of the recorded data and the simulation of the pair of transfer functions.

2. The system of claim 1, wherein the first recorder is a passive recorder.

3. The system of claim 1, wherein the first recorder is an airborne sensor and the second recorder a ground based sensor.

4. The system of claim 1, wherein the second recorder is a passive recorder.

5. The system of claim 1, wherein the first recorder is an airborne sensor of a first airborne system and the second recorder is an airborne sensor of a second airborne system.

6. The system of claim 1, wherein the at least one processor configured to infer the subsurface impedance map recovers a background field and a secondary field including data indicative of the object.

7. A method for detecting an object in a subsurface environment comprising:
    collecting data indicative of an orthogonal component of an electromagnetic field;
    collecting data indicative of a vertical component of an electromagnetic field;
    deriving a pair of actual transfer functions using the data indicative of the orthogonal component and the data indicative of the vertical component of the electromagnetic field;
    deriving a pair of simulated transfer functions using a simulation of a background primary field;
    performing an inversion to update model parameters reducing a discrepancy between the pair of actual transfer functions and the pair of simulated transfer functions using a-priori information; and
    simulating a secondary field for a set of model parameters using the inversion and the pair of simulated transfer functions to resolve a subsurface impedance map including the object.

8. The method of claim 7, wherein the pair of simulated transfer functions correspond to the pair of actual transfers.

9. The method of claim 7, wherein collecting the data indicative of the orthogonal component includes collecting data indicative of both polarizations of the orthogonal component using a passive ground-based recorder and wherein collecting the data indicative of the vertical component includes collecting data indicative of both polarizations of the vertical component using a passive airborne recorder.

10. The method of claim 7, wherein collecting the data indicative of the vertical component includes collecting data indicative of both polarizations of the vertical component.

11. The method of claim 7, further comprising regularizing and stabilizing the subsurface impedance map using the a-priori information.

12. The method of claim 7, further comprising enforcing, using the a-priori information, an edge preserving total variation function.

13. The method of claim 7, further comprising enforcing, using the a-priori information, the subsurface impedance map to have tabular structures using a parametric level set function.

14. The method of claim 7, further comprising generating the model parameter update by performing a non-linear constraint optimization.

15. The method of claim 14, further comprising generating the model parameter update by performing the non-linear constraint optimization using a noise model.

16. The method of claim 14, further comprising generating the model parameter update by performing the non-linear constraint optimization using a motion compensation model.

17. A computer program product for detecting an object in a subsurface environment, the computer program product comprising a computer readable storage medium having program instructions embodied therewith, the program instructions executable by a processor to cause the processor to:
    collect data indicative of an orthogonal component of an electromagnetic field;
    collect data indicative of a vertical component of an electromagnetic field;

derive a pair of actual transfer functions using the data indicative of the orthogonal component and the data indicative of the vertical component of the electromagnetic field;

derive a pair of simulated transfer functions using a simulation of a background primary field;

perform an inversion to update model parameters reducing a discrepancy between the pair of actual transfer functions and the pair of simulated transfer function using a-priori information; and simulate a secondary field for a set of model parameters using the inversion and the pair of simulated transfer functions to resolve a subsurface impedance map including the object.

18. The computer program product of claim 17, wherein the pair of simulated transfer functions correspond to the pair of actual transfers.

19. The computer program product of claim 17, wherein collecting the data indicative of the orthogonal component includes collecting data indicative of both polarizations of the orthogonal component.

20. The computer program product of claim 17, wherein collecting the data indicative of the vertical component includes collecting data indicative of both polarizations of the vertical component.

* * * * *